(12) United States Patent
Heath et al.

(10) Patent No.: US 6,937,821 B1
(45) Date of Patent: Aug. 30, 2005

(54) OPTICAL POWER TRANSIENT MONITOR

(75) Inventors: Richard W Heath, Harlow (GB); Duncan J Forbes, Hertfordshire (GB)

(73) Assignee: Nortel Networks Limited, St. Laurent (CA)

( * ) Notice: Subject to any disclaimer, the term of this patent is extended or adjusted under 35 U.S.C. 154(b) by 641 days.

(21) Appl. No.: 10/008,080

(22) Filed: Nov. 2, 2001

(51) Int. Cl.$^7$ ............................................. H04B 10/08
(52) U.S. Cl. ......................................... 398/38; 398/94
(58) Field of Search .............................. 398/210, 120, 398/94, 38, 197

(56) References Cited

U.S. PATENT DOCUMENTS

| | | | |
|---|---|---|---|
| 6,347,169 B1 * | 2/2002 | Kang et al. .................... | 385/24 |
| 6,563,614 B1 * | 5/2003 | Stephens et al. ................ | 398/5 |
| 2002/0114029 A1 * | 8/2002 | Seydnejad et al. .......... | 359/110 |

* cited by examiner

Primary Examiner—M. R. Sedighian
Assistant Examiner—Christina Y. Leung
(74) Attorney, Agent, or Firm—Barnes & Thornburg

(57) ABSTRACT

A method for detecting power transients in a signal wavelength carried by an optical transmission medium in a band consisting of a first plurality of wavebands, such as a wavelength division multiplexed signal, comprises dividing the band into a second plurality of wavebands, equal to or less than the first plurality, and detecting power transients within each of the second plurality of wavebands. The power of each wavelength in the second plurality of wavebands is determined by detecting the power level in each second plurality of wavebands as a function of the contribution from each of the wavebands in the second plurality of wavebands to derive a plurality of simultaneous equations, equal in number to the second plurality of wavebands, and solving the plurality of simultaneous equations to determine the levels of each wave-length component of each waveband in the second plurality of wavebands. Correlation with error bursts detected in the optical receiver enable an audit of the error event to be conducted.

10 Claims, 3 Drawing Sheets

OPTICAL POWER TRANSIENT MONITOR

FIELD OF THE INVENTION

The present invention concerns a method or technique for monitoring power transients in an optical transmission system or network, preferably but not exclusively a Wavelength Division Multiplex (WDM) optical transmission system or network. The invention also encompasses apparatus for performing the method, the corresponding control program, a carrier containing the software and computing apparatus for operating the program.

BACKGROUND TO THE INVENTION

Telecommunication systems have become increasingly more complex since their inception. Modern systems are exceedingly fast and versatile, capable of carrying a multitude of different types of traffic in the same instant and over vast distances, all without human intervention. However, they necessarily imply correspondingly more complex and "intelligent" management and control systems to keep track of traffic, monitor the level of service, ensure the most efficient strategy for running the network and so on. Monitoring the network paths for errors and continuity is one specific aspect of control and management that is of particular concern.

Optical transmission is now the norm for certain parts of networks. Spans of optical fibre interconnect geographically spaced locations, often covering tens or hundreds of kilometers at a time. Recent trends in optical communication include Wavelength Division Multiplex (WDM) in which a plurality of wavelengths or wavebands are allocated to a channel, each band being capable of supporting traffic.

A typical span in an optical network is illustrated schematically in FIG. 1. An optical fibre 1 connects spaced locations A and B through one or more amplifiers, such as those indicated at 2, 3 in the drawing. These may be wholly optical or electro-optical, in which case there is a requirement for electrical-to-optical and optical-to-electrical converters in each amplifier. The transmit end A of the span typically comprises a plurality of optical input paths 4, passing through a corresponding plurality of circuits indicated generally at 5, into an optical multiplexer 6. At the receive end B an optical demultiplexer 7 splits the received optical signal into a corresponding number of receive paths 8, each with its own detector indicated generally at 9. Each input path to the multiplexer 6 and each output path from the demultiplexer 7 corresponds to one of the bands into which the signal bandwidth is divided in a WDM system.

Each link of a complex network would include one or more spans of the above general type and construction, arranged to interconnect nodes in the network, for example where the network branches. FIG. 2 illustrates schematically one such node 10 in a network at which an incoming waveband 11 from an upstream location enters from the left and exits 12 from the right on to a downstream location. It should be noted that the expressions "upstream" and "downstream" are used in the present context to illustrate a particular connection at a particular point in a network and it is not intended that the scope of the invention is to be generally restricted in any specific sense.

It is often the case that one (or more) of the wavebands making up the total signal band will be split off from the band at the node. Similarly, another band (or bands) may enter the node from another point in the network and join the signal channels directed in the downstream direction. Such an example is illustrated generally in FIG. 2. As part of the control process in an optical network, the average power in the channels is monitored at various locations throughout the network. In the present example, monitoring means could be located in the downstream channels 12 exiting the node 10.

Consider now the scenario in which an error, break or other discontinuity 13 occurs in one of the fibres constituting the upstream channels 11 entering the node. Although the channels traversing the errored or broken fibres may now not appear at the downstream node, indicating the presence of a fault, the channels inserted at 14 for onward transmission along the downstream fibre will still be present and may now display a power fluctuation or transient due to the non-ideal behaviour of the optical amplifiers along the fibre. These transients may be regarded by the communications network management system as additional, separate faults unless a method is provided to detect channel power transients and their progression between wavelength channels throughout the network. Similar transients may be caused by the deliberate introduction of channels into the network to increase capacity, and any impact on neighbouring channel powers must be detected and correlated in order that a false alarm is not raised on that neighbouring channel.

Prior art methods of monitoring channels have usually involved only average power measurement, as indicated in the preceding paragraphs. FIG. 3 is useful to illustrate one generic type of power monitoring system in which each output channel 20 from a demultiplexer 21 receiving an optical waveband 22 is connected through a respective series detector 23 in the channel. There are as many detectors as there are channels in this arrangement, commonly known as parallel scanning. This arrangement is accurate but carries a punitive cost penalty in that it requires one set of detectors or monitoring devices per channel.

In another known monitoring arrangement (not illustrated) a single scanner is arranged to be supplied with signals from each channel in turn by means of a fast serial scanning filter. However, such filters are still not fast enough to handle the high levels of traffic in such networks without causing unacceptable delays.

Monitoring the total power in all of the channels combined is fast but crude since it gives no indication as to how the individual wavelengths are affected, especially by transients.

Another technique previously employed is monitoring the eye closure of the channels. This is a measure of the amplitude response of the channel. In order to be effective, however, fast eye monitoring is necessary and it too comes with a punitive cost penalty.

SUMMARY OF THE INVENTION

As will become apparent, the invention provides a radical departure from known methods of monitoring in that it relies on detecting power transients in a plurality of wavebands that are not necessarily related to the signal channels in the network. These can then be used for identifying rapidly and economically errors and/or discontinuities in an optical transmission channel.

In accordance with the invention, a method for detecting power transients in signals carried by an optical transmission medium in a band consisting of a first plurality of wavebands comprises dividing the band into a second plurality of wavebands, equal to or less than the number of the first plurality, and detecting power transients within each of the second plurality of wavebands.

Preferably the number of second channels is less than the first plurality. The power level of each wavelength in the second plurality of wavebands is preferably determined by detecting the power level in each second plurality of wavebands as a function of the contribution from each of the wavebands in the second plurality of wavebands to derive a plurality of simultaneous equations, equal in number to the number of the second plurality of wavebands, and solving the plurality of simultaneous equations to determine the levels of each wavelength component of each wave-band in the second plurality of wavebands.

The invention also comprises an optical communications network including at least one optical transmission medium adapted to carry optical signals occupying a waveband consisting of a first plurality of wavebands; an optical waveband splitter for splitting the waveband into a second plurality of wavebands, equal to or less than in number the number of the second plurality of wavebands; a power detector in each of the second plurality of wavebands for detecting the instantaneous power of signals in the corresponding waveband as a function of the contribution from all of the detectors in the second plurality of wavebands, whereby to derive a set of simultaneous equations; solving means for solving the set of simultaneous equations to determine the instantaneous power in each of the second plurality of wavebands.

The instantaneous powers thus determined are preferably compared in a correlator with error signals derived from an optical receiver adapted to receive signals in the first plurality of wavebands, whereby to derive information as to the event that caused the error.

BRIEF DESCRIPTION OF THE DRAWINGS

The invention will be described with reference to the following drawings, in which.

DETAILED DESCRIPTION OF THE ILLUSTRATED EMBODIMENTS

Figure 1:
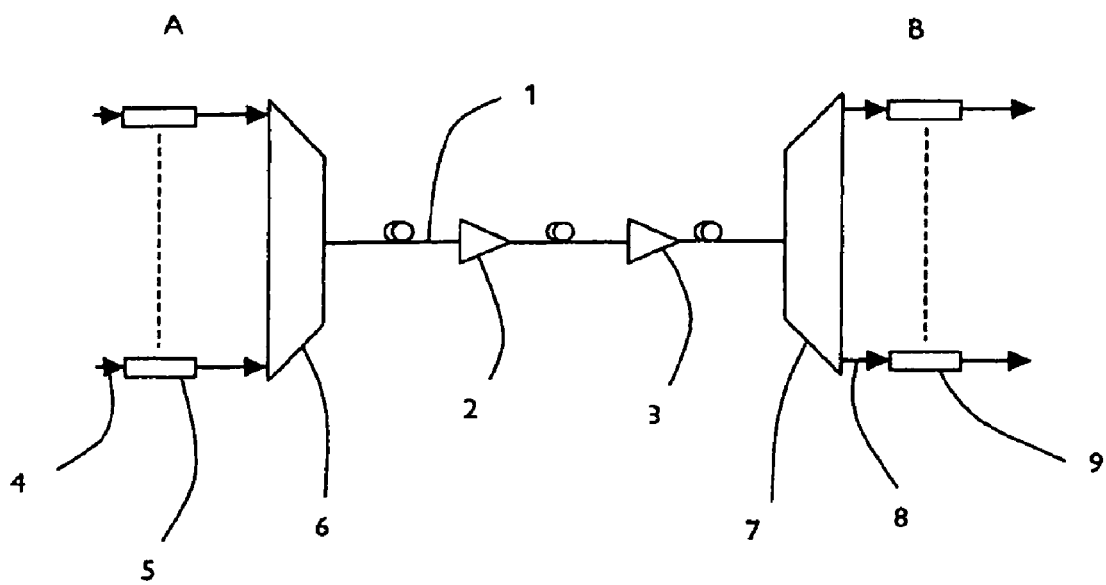
FIG. 1 is a schematic illustration of a typical multiplexed optical transmission link in an optical communication network.
Figure 2:
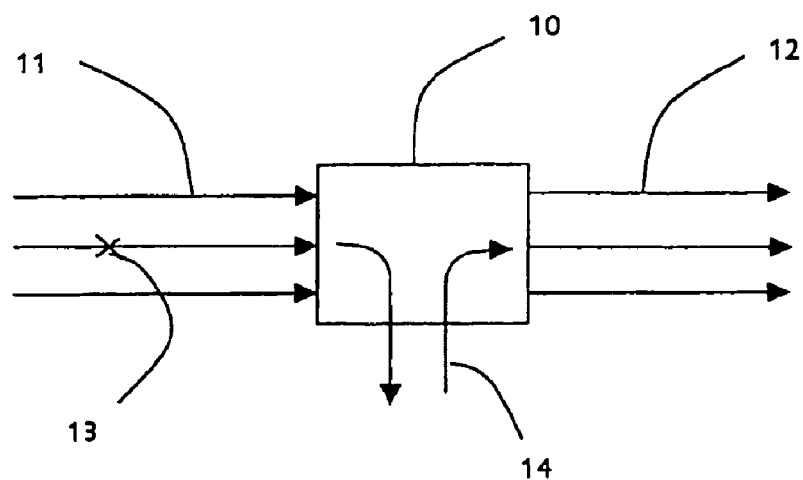
FIG. 2 illustrates schematically an event at a node in the network.
Figure 3:
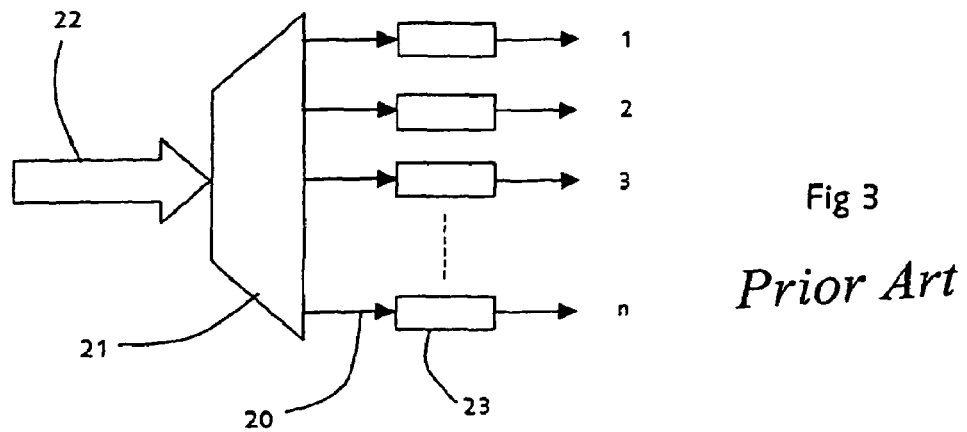
FIG. 3 illustrates schematically a prior method of monitoring power in part of a network.
Figure 4:
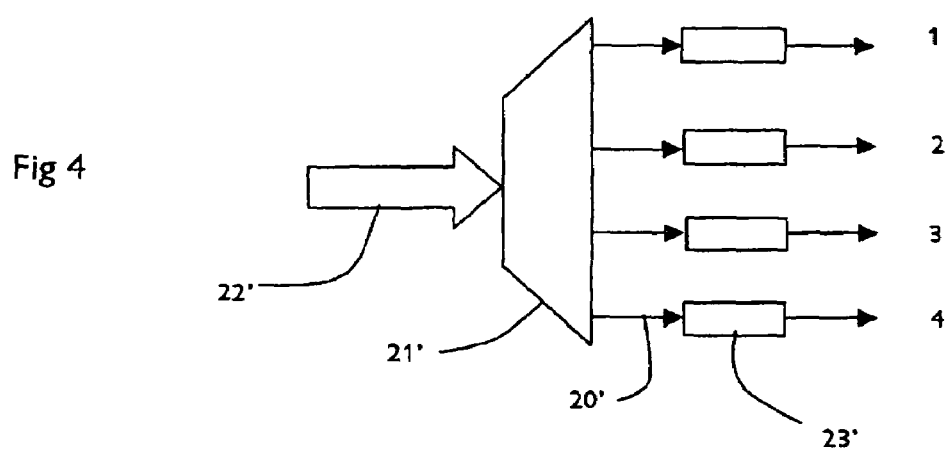
FIG. 4 illustrates the method according to the invention.

It will be recalled that monitoring the power in the channels of a wavelength division multiplexed optical transmission network can be effected by monitoring the power in the individual channels. This requires one detector arrangement per channel. The invention has the inherent capacity to reduce this requirement. Referring to FIG. 4, which uses the same reference numerals as in FIG. 3 but with a prime, the combined transmission channel 22' is split into separate outputs 1, 2, 3, 4 by a wavelength sensitive splitter 21' instead of the demultiplexer 21 previously mentioned. The transient power in each of those outputs is measured in detection circuitry 23' in each of those channels. It is to be understood that the channels 1, 2, 3, 4 do not necessarily have any relationship with the transmission channels of, for example, a span of a WDM transmission network.

In the illustrated situation, four channels 20' and detectors 23' are envisaged, although any number can be used, up to and including one per transmission channel, if necessary.

Figure 5:
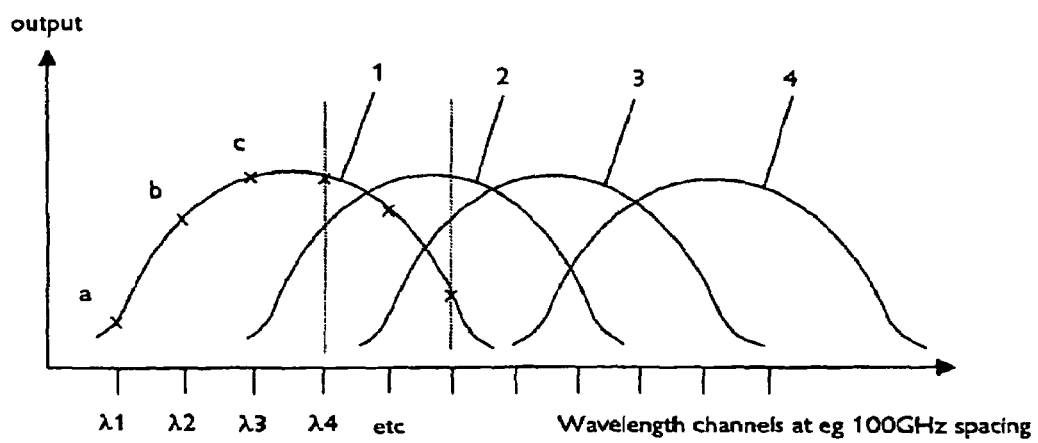
FIG. 5 illustrates the principles involved in the invention.

The responses of the individual channels 1, 2, 3, 4 (in this case) are shown diagrammatically by the four overlapping curves 1, 2, 3, 4 in FIG. 5. The requirement for the quality of the filter elements constituting the splitter 21' is considerably less than in any of the known systems for power monitoring at a per channel level. In particular, the technique employed in the invention does not rely on absolute power, wavelength accuracy or wavelength resolution. It is the relative change in power, ie power transients, that is fundamental to the invention.

The four detector responses overlap, as can be seen in FIG. 5. The power at any instant in any one of the individual channels 1 to 4 is the sum total of the instantaneous power contribution from the channel in question and any of the neighbouring channels. Considering the points marked a, b, c in FIG. 5, there is little or no contribution from the pass band of the channel 2 neighbouring channel 1. However, considering the wavelengths marked by the vertical broken lines, there may be two or three (or possibly more, if there are comparatively many, closely spaced passbands) contributions from overlapping channels. An example is illustrated in FIG. 5 where the broken vertical lines intersect the pass bands of two or more neighbouring channels.

The total power detected in each respective power detector is the sum of the contributions from each of the overlapping wavelength channels. This can be expressed mathematically in the following equation, in which PD1 is the detected power in channel 1 and so on:

$PD1 = a1\lambda1 + b1\lambda2 + c1\lambda3 + \ldots + r1\lambda r$ $PD2 = a2\lambda1 + b2\lambda2 + c2\lambda3 + \ldots + r2\lambda r$

\*

\*

$PDN = aN\lambda1 + bN\lambda2 + cN\lambda3 + \ldots + rN\lambda r$

Where a, b, c . . . represent coefficients multiplying the optical power of the respective wavelengths $\lambda 1, \lambda 2, \lambda 3 \ldots \lambda r$. There will be as many equations as there are detector channels. The upper value of wavelength, that is $\lambda r$, will correspond to the upper limit of the split waveband. It will also be appreciated that significant numbers of the coefficients a, b, c etc will be zero since there will be no contribution of certain wavelengths from remote filter bands. For example, FIG. 5 shows that at wave-length $\lambda 3$ (say) there is only a contribution from PD1 and PD2 and none from PD3 or PD4. The c-coefficients for PD3 and PD4 will thus be zero.

Figure 6:
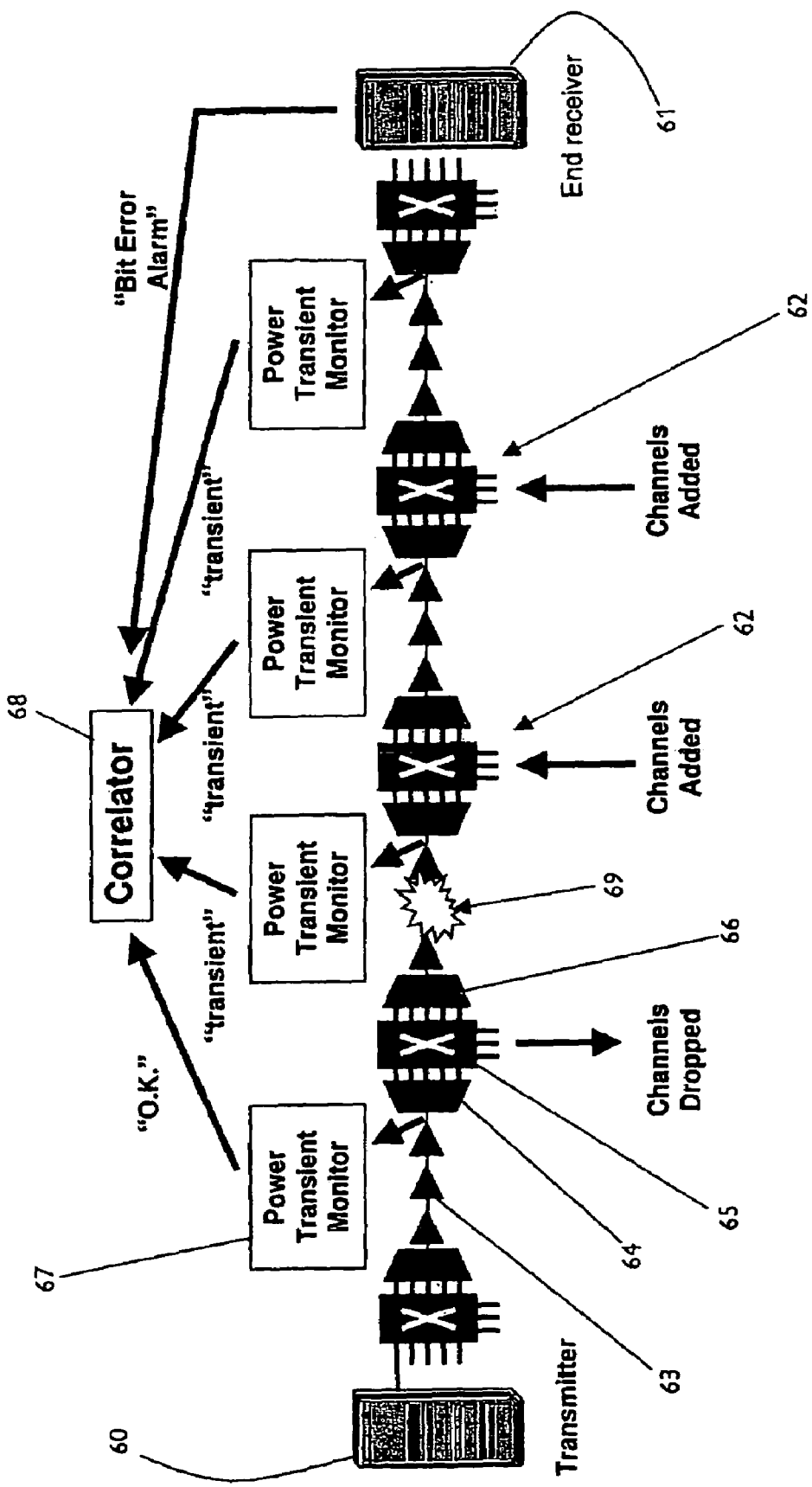
FIG. 6 illustrates the application of the invention to a network.

Solving these simultaneous equations for the various coefficients provides a measure of the instantaneous power levels for each wavelength $\lambda$. These can then be used to detect power transients on any wavelength. Such transients may have been occasioned by events on other wavelengths, as mentioned previously, on a multiplex that it has traversed. As shown in FIG. 6, the detected transients may be correlated with error bursts that can be detected at a receiver (such as Real errors, BIP8 counts or as FEC correction events) in order, for example, to audit the events that have occurred within the system to have caused the detected errors. Examples of events include fibre breaks or wavelength add/drop but these are illustrative only and are not to be taken as limiting the scope of the invention in any way.

In FIG. 6, a section of a transmission span between a transmitter 60 and an end receiver 61 is schematically illustrated. The span includes a succession of devices, such as add/drop devices 62, interspersed with amplifiers 63, as before. Each device includes a demultiplexer 64, cross-connect switch 65 and multiplexer 66, allowing the incoming signal band to be demultiplexed, so that individual bands can be diverted to other paths, links, circuits etc via the cross-connect switch., and the signal bands to be sent forward to the next device can be multiplexed for onward transmission. Each device is provided with a power transient monitor 67 according to the invention in order to output a signal depending on the condition of the monitored power. In the illustrated scenario, the first span is not faulty and the transient monitor issues an "OK" signal to the correlator 68 to that effect. In the next span there is assumed to be a line fault condition 69, such as a fibre break. Although the channels traversing the link that suffers the break now disappear (which will be readily spotted by other monitoring systems), the channels added to this transmission span downstream of the fibre break will still be present, and will display a power transient due to the optical amplifier operation. The power transient monitor downstream of the fault location detects a power transient on the affected wavelengths, as previously described, and issues a "transient" signal to the correlator. Similar "transient" signals are generated at each of the devices further downstream, as far as the receive end of the span. The end receiver 61 will itself generate a "bit error alarm" signal when it detects that the data received over the span contains a data error due to the incurred power transient. This signal is likewise fed to the correlator 68. The correlator processes the various signals sent to it by the power transient monitors 67 in order to identify the nature and the location of the fault condition.

What is claimed is:

1. A method for detecting power transients in a signal wavelength carried by an optical transmission medium in a band consisting of a first plurality of wavebands comprising dividing the band into a second plurality of wavebands, equal to or less than the first plurality, and detecting power transients within each of the second plurality of wavebands, wherein the power of each wavelength in the second plurality of wavebands is determined by detecting the power level in each second plurality of wavebands as a function of the contribution from each of the wavebands in the second plurality of wavebands to derive a plurality of simultaneous equations, equal in number to the second plurality of wavebands, and solving the plurality of simultaneous equations to determine the levels of each wavelength component of each waveband in the second plurality of wavebands.

2. A method as claimed in claim 1, wherein the number of second wavebands is less than the first plurality.

3. A method as claimed in claim 1, wherein the second set of wavebands is unrelated to the channels in the system by wavelength alignment.

4. A method as claimed in claim 1, wherein the second set of wavebands is unrelated to the channels in the system by waveband shape.

5. An optical signal whose power transient has been detected by the method according to claim 1.

6. A carrier on which is stored a program adapted to perform the method steps of claim 1.

7. An optical communications network including at least one optical transmission medium adapted to carry optical signals occupying a waveband consisting of a first plurality of wavebands; an optical waveband splitter for splitting the waveband into a second plurality of wavebands, equal to or less than the number of the first plurality of wavebands; a detector in each of the second plurality of wavebands for detecting the instantaneous power of signals in the corresponding waveband as a function of the contribution from all of the detectors in the second plurality of wavebands, whereby to derive a set of simultaneous equations; and a simultaneous equation solver for solving the set of simultaneous equations to determine the instantaneous power of each wavelength component of each waveband in each of the second plurality of wavebands.

8. An optical communications network as claimed in claim 7, wherein the simultaneous equation solver comprises a computer program.

9. An optical communications network as claimed in claim 7, further comprising an optical receiver adapted to receive signals in the first plurality of wavebands; an error detector to detect errors in signal wavebands received by said receiver; and a correlator adapted to compare the instantaneous powers determined by the simultaneous equation solver with said error signals, whereby to derive information as to the event that caused the error.

10. An optical receiver adapted to receive, from an optical transmission path, wavelength division multiplexed optical signals occupying a waveband consisting of a first plurality of wavebands, the receiver comprising; an optical waveband splitter for splitting the waveband into a second plurality of wavebands, equal to or less in number than the number of the first plurality of wavebands; a detector in each of the second plurality of wavebands for detecting the instantaneous power of signals in the corresponding waveband as a function of the contribution from all of the detectors in the second plurality of wavebands, whereby to derive a set of simultaneous equations; and a simultaneous equation solver for solving the set of simultaneous equations to determine the instantaneous power of each wavelength component of each waveband in each of the second plurality of wavebands.

* * * * *